United States Patent
Dubey et al.

(10) Patent No.: US 12,231,745 B1
(45) Date of Patent: Feb. 18, 2025

(54) AUTOMATED VIDEO SUMMARY GENERATION USING TEXTUAL QUOTES

(71) Applicant: Amazon Technologies, Inc., Seattle, WA (US)

(72) Inventors: Deep Dubey, Bellevue, WA (US); Sushanta Das, Kirkland, WA (US); Kenneth Benoit, Ravensdale, WA (US); Anup Gandotra, Shoreline, WA (US); Adam Fluckey, Shoreline, WA (US); Nikhil Kajale, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 341 days.

(21) Appl. No.: 16/255,344

(22) Filed: Jan. 23, 2019

(51) Int. Cl.
  *H04N 21/8549* (2011.01)
  *G11B 27/031* (2006.01)
  *G11B 27/22* (2006.01)
  *H04N 21/482* (2011.01)
  *H04N 21/845* (2011.01)

(52) U.S. Cl.
  CPC ....... *H04N 21/8549* (2013.01); *G11B 27/031* (2013.01); *G11B 27/22* (2013.01); *H04N 21/4828* (2013.01); *H04N 21/8456* (2013.01)

(58) Field of Classification Search
  CPC ........... H04N 21/8549; H04N 21/4828; H04N 21/8405; H04N 21/8456; G10L 15/265; G11B 27/031; G11B 27/22
  USPC ......................................................... 386/244
  See application file for complete search history.

(56) References Cited

U.S. PATENT DOCUMENTS

| | | | |
|---|---|---|---|
| 8,447,165 B1* | 5/2013 | Hughes | H04N 5/93 386/241 |
| 10,037,129 B2* | 7/2018 | Lewis | G06F 3/04842 |
| 2009/0129749 A1* | 5/2009 | Oyamatsu | H04N 21/4332 386/241 |
| 2013/0195422 A1* | 8/2013 | Patil | H04N 21/4828 386/239 |
| 2014/0089424 A1* | 3/2014 | Oztaskent | H04L 51/08 709/206 |
| 2018/0341705 A1* | 11/2018 | Kim | G06F 16/7837 |
| 2019/0392215 A1* | 12/2019 | Hagio | G06K 9/00744 |

* cited by examiner

*Primary Examiner* — Helen Shibru
(74) *Attorney, Agent, or Firm* — Eversheds Sutherland (US) LLP

(57) ABSTRACT

Systems, methods, and computer-readable media are disclosed for systems and methods for automated video summary generation using textual quotes. Example methods may include determining first text representing a phrase spoken in video content, determining that the first text is present in first subtitle data of first video content, determining a first timestamp and a second timestamp associated with the first text in the first subtitle data, determining a first video segment of the first video content corresponding to the first timestamp and the second timestamp, and generating a first video summary for the first video content, the first video summary comprising the first video segment.

14 Claims, 8 Drawing Sheets

AUTOMATED VIDEO SUMMARY GENERATION USING TEXTUAL QUOTES

BACKGROUND

Certain digital content, such as movies, television shows, and other video content may be previewed using trailers. For example, prior to a movie release, a movie studio may generate and release a movie trailer that previews content of the movie. After the movie is released, however, certain portions of the movie, such as quotes from the movie, may become popular with viewers and may become associated with the movie. However, the portion of the movie with the quote may not have been included in the trailer. In addition, quotes or portions of movies that are popular may change over time. Accordingly, automated video summary generation using textual quotes may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
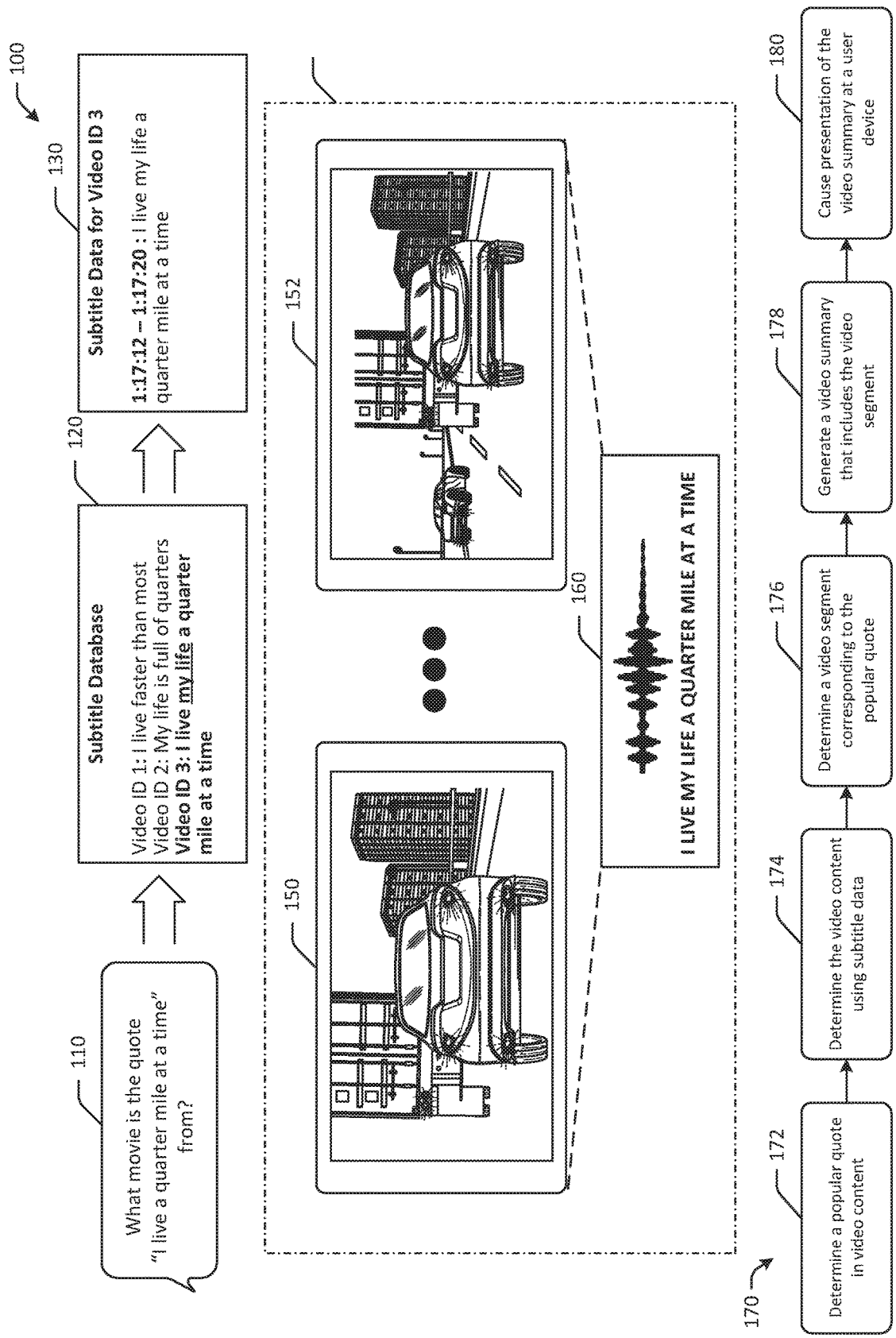
FIG. 1 is a schematic illustration of an example use case for automated video summary generation using textual quotes in accordance with one or more example embodiments of the disclosure.

Digital content may include video content, such as movies, television shows, streaming shows (e.g., made for Amazon Prime, Netflix, etc.), and other video content. Users may consume such video content. To preview video content, content creators, such as movie producers, networks, and other associated entities may generate video summaries, such as trailers, that can be consumed by users. Trailers or video summaries may include portions of video content that the creator of the trailer determines should be included, and may be reflective of a plot or events that occur in the video content. Trailers or video summaries may be generated before content is released in some instances, and may be manually generated.

However, after the video content is released or otherwise accessible to users, one or more portions of the video content may become popular with users and/or may otherwise become associated with the video content. For example, quotes or phrases like "I'll be back," "You can't handle the truth," and "We're going to need a bigger boat" may become associated with the respective movies in which they appear, but at the time a trailer was generated for the respective movies, the portions of the movies in which the quotes appear may not have been included because the creator of the trailer may not have known that the quote would eventually become popular. In some instances, trailers may be edited manually to include portions of content with quotes that have become popular, but quotes that are popular may change over time. As a result, a manual process may require an operator to identify popular quotes, scan through video content to find the portion of the video content that includes the quote, and modify trailers to include the portion. Manual editing may therefore be inexact (e.g., because different operators may include different amounts of the portion, etc.) and impractical.

Embodiments of the disclosure include systems and methods to automatically generate video content summaries, such as trailers or previews, using textual quotes. For example, certain embodiments may automatically generate video content summaries using textual quotes. Some embodiments may generate video content summaries by implementing one or more rules to determine popular quotes (which may be in text form), identify video content in which the popular quote appears, identify a portion of the video content in which the popular quote is spoken by a character, and extracting the portion of the video content as a standalone video clip and/or to include in a video summary or content trailer. In some embodiments, searching of content may be performed using embodiments of the disclosure. For example, a user may not know the title of a television show in which a quote appears, but may know the quote. Accordingly, some embodiments may be configured to determine or otherwise identify content using quotes that are input by a user (which may be in voice input or text input form).

In some embodiments, video segments or video clips that include certain quotes may be determined and extracted from a movie or other video content using one or more machine learning algorithms. The extracted video segment may be included in an automatically generated video summary or trailer. To generate video summaries, certain embodiments may determine a quote that is to be included in the video summary. Quotes may be sourced from services or third parties, such as IMDb.com, social media platforms, fan websites, and so forth. Subtitle or caption data for one or more pieces of video content may be searched to identify the video content in which the quote appears. Subtitle or caption data may be provided with video content, or may be automatically generated using audio-to-text conversion. In some embodiments, an exact match may not be found, so a closest match may be determined. The video content with the closest match or an exact match to the quote may be determined and corresponding timestamps at which the subtitle corresponding to the quote may be determined. Some embodiments may extract a video segment from the video content corresponding to the timestamps. The extracted video segment may be included in a trailer or other video summary for the video content. Accordingly, users that consume the video content may view the portion of the video content that has the specific quote, such as a popular quote.

This disclosure relates to, among other things, devices, systems, methods, computer-readable media, techniques, and methodologies for automated video summary generation using textual quotes and presentation. Certain embodiments may automatically generate content summaries for digital content, such as video content (e.g., movies, television programs, streaming content, etc.), based at least in part on one or more quotes that appear in the video content. Certain embodiments generate content summaries using, for example, analysis of audio, video, and text (e.g., closed captioning, synopses, metadata, etc.) components of digital content, such as a movie, video, or other digital content. Certain embodiments determine aspects of content summaries, such as length and/or scene selection, using machine learning and other methodologies. In some instances, machine learning (e.g., deep neural networks, long short term memory units and/or recurrent neural networks, etc.) may be used to identify various elements of content that may increase a rate of conversion for users that consume a content summary.

Referring to FIG. 1, an example use case 100 for automated video summary generation using textual quotes is depicted in accordance with one or more example embodiments of the disclosure. For example, a user may be interested in viewing video content, such as a movie or a television show, that includes a certain quote. The user may not be aware of the title of the video content in which the quote appears. Accordingly, the user may utter a voice command or voice input at a user device, such as a speaker device, a content streaming device, or another device configured to receive voice input, requesting playback of certain content. For example, in FIG. 1, the user may speak an utterance 110 of "what movie is the quote 'I live a quarter mile at a time' from?" The user device may determine the utterance 110 and may communicate with one or more remote servers to determine a meaning of the utterance 110 and to determine a corresponding video content and specific video segment in which the quote appears.

For example, the user device may send voice data representative of the utterance 110 to one or more remote servers. The one or more remote servers may process the voice data to determine that an intent of the utterance 110 is to find a video segment of video content in which the quote appears. Accordingly, the remote server may determine the quote in text form. For example, a speech-to-text transcription of the utterance 110 may be used to determine that the quote the user is interested in is "I live a quarter mile at a time." The text of the quote may be used to identify video content in which the quote appears.

The remote server may determine a set of candidate video content in which the quote may appear. The set of candidate video content may include a number of video content pieces, such as movies, episodes of shows, and other video content. Some or all of the video content may be associated with video files and subtitle files. The video files may include video data for playback of the video content, and the subtitle files may include subtitle data (e.g., closed caption data, text data, synopsis data, etc.). The subtitle data may include text for presentation during playback of the video content, as well as timestamp data indicative of a time during playback at which certain text is to be presented. The text may correspond to what a character in the video content says at a particular time. For example, at one hour forty minutes and thirteen seconds into a movie, a character may say "I'll be back." The subtitle data for the movie may therefore include the text of "I'll be back" with corresponding timestamp(s) of 01:40:13 and 01:40:16. In some instances, only one timestamp may be included, such as an initial timestamp. During playback of the video content, the appropriate subtitle text may therefore be presented using the timestamp(s).

The remote server may search the subtitle data for text that matches or substantially matches the text of the quote input. The remote server may determine one or more matches or partial matches. For example, in FIG. 1, the remote server may identify, using a subtitle database 120, three video content identifiers that include text that at least partially matches the quote of "I live a quarter mile at a time." The video content identifiers may include a first video content identifier that is associated with subtitle data that includes the text "I live faster than most," a second video content identifier that is associated with subtitle data that includes the text "My life is full of quarters," and a third video content identifier that is associated with subtitle data that includes the text "I live my life a quarter mile at a time." Additional or fewer video content identifiers may be identified.

The remote server may generate one or more scores for the first, second, and third video content identifiers indicative of the match between the respective subtitle text and the quote text. If an exact match is determined, the corresponding video content identifier may be a top-ranked or highest-ranked video content identifier. If an exact match is not determined, the video content identifier with the closest match may be determined to have the highest score. In the example of FIG. 1, the remote server may determine that the third video content identifier is the top-ranked video content identifier based at least in part on the match between the subtitle text and the quote text. For example, the remote server may determine that the text is the same but for the words "my life" in the subtitle data for the third video content identifier. Accordingly, the remote server may determine that the user intended to search for the quote "I live my life a quarter mile at a time." Users may therefore not have to provide exact quotes for the remote server to determine the appropriate video content.

The remote server may determine timestamp data associated with the subtitle data for the quote text. For example, the remote server may determine subtitle data 130 for the third video content identifier. The subtitle data 130 may include a set of subtitle text and corresponding timestamps for presentation. The remote server may determine, using the subtitle data 130, that the timestamps corresponding to the subtitle text "I live my life a quarter mile at a time" are a first timestamp of 1:17:12 and a second timestamp of 1:17:20, which may indicate that the subtitle text is to be presented at and/or between those times during playback of the third video content.

The remote server may determine a video segment 140 or video clip of the third video content that corresponds to the first timestamp of 1:17:12 and a second timestamp of 1:17:20. The video segment may therefore have a length of about three seconds. The remote server may extract the video segment from the video content. For example, a first frame 150 of the video content may be presented at the first timestamp of 1:17:12 and a second frame 152 may be presented at the second timestamp of 1:17:20. The remote server may extract the first frame 150, the second frame 152, and any frames in between to include in the video segment 140. The remote server may extract corresponding audio 160 from an audio file associated with the third video content. The audio 160 may include a character saying the quote text, such as "I live my life a quarter mile at a time." The audio 160 may be included in the video segment 140. As a result, the portion of the video content that includes the quote (which may be referred to as video segment) may be determined and extracted. The video segment may then be played back and/or included in a trailer or other video summary for the user. Playback may begin automatically responsive to the request in the utterance 110.

In some embodiments, to generate content summaries using textual quotes, an example process flow 170 is presented and may be performed, for example, by one or more trailer generation engines at one or more remote servers. The remote server and/or computer system may include at least one memory that stores computer-executable instructions and at least one processor configured to access the at least one memory and execute the computer-executable instructions to perform various actions or operations, such as one or more of the operations in the process flow 170 of FIG. 1.

At a first block 172, the remote server may determine a popular quote in video content. For example, the remote server may determine a search query from a user that includes a popular quote, or a voice input or voice command that includes a popular quote. In some instances, popular quotes may be determined from one or more services or third parties, such as video content review sites, social media sites, image sharing sites, and other services or third parties. The remote server may determine first text of a phrase spoken by a character in video content. The phrase spoken by the character may be the quote.

At a second block 174, the remote server may determine the video content using subtitle data. For example, a request may not be associated with a particular video content, such as a particular movie. Instead, a user may input a request for content that includes a quote and not a content identifier, such as a title. The remote server may identify the video content in which the quote appears using subtitle data associated with a set of candidate video content. The remote server may, for example, determine first subtitle data for a first movie, where the first subtitle data represents dialogue that occurs in the first movie. The remote server may determine that a substantially similar match to the first text is present in the first subtitle data. Because an exact match may not yet have been found, the remote server may determine second subtitle data for a second movie, where the second subtitle data represents dialogue the occurs in the second movie. The remote server may determine that an exact match to the first text is present in the second subtitle data, and may therefore determine that the video content is the second movie, or that the requested quote appears in the second movie.

At a third block 176, the remote server may determine a video segment corresponding to the popular quote. The remote server may determine timestamps that correspond to the quote that was identified in the subtitle data, and may determine or extract the corresponding video segment from video file(s) associated with the second movie. For example, the remote server may determine a first timestamp corresponding to a beginning of the first text or the quote in the subtitle data, and may determine a second timestamp corresponding to an end of the first text or the quote using the subtitle data. The remote server may determine a video file associated with the second movie and may extract a first video clip from the first timestamp to the second timestamp from the video file.

At a fourth block 178, the remote server may generate a video summary that includes the video segment. For example, the remote server may generate a movie trailer that includes the extracted video segment. In some embodiments, an existing trailer may be modified to include the video segment, while in other embodiments, a new trailer may be generated that includes the video segment.

At a fifth block 180, the remote server may cause presentation of the video summary at a user device. For example, as illustrated in FIG. 1, the video summary may be presented at a user device. In some embodiments, the video summary may be presented responsive to the user utterance 110. In some embodiments, content summaries that are generated may be stored for later presentation to other users.

As a result, the user may be presented with a video clip and/or a video summary for content that includes a particular scene corresponding to a quote that the user is interested in. In addition, quotes that have become popular may be automatically included in trailers or other summaries for presentation to users even without a request for the quote.

Embodiments of the disclosure may include automated video summary generation using textual quotes, and may include one or more modules that can be used to analyze digital content. Some embodiments may output video clips that include certain quotes. One or more detection modules may be used to process and/or detect various features in the content. In some instances, a module may perform more than one form of analysis. Such detections may be used to generate scores for respective segments of content.

Example embodiments of the disclosure provide a number of technical features or technical effects. For example, in accordance with example embodiments of the disclosure, certain embodiments of the disclosure may automatically analyze audio, video, and/or text components of content. Certain embodiments may recognize or identify presence of certain textual terms (and/or audio terms that are translated to text form) and may use one or more machine learning modules or algorithms. As a result of improved functionality, content summaries may be automatically generated and may include content that may have specific quotes spoken by characters. Embodiments of the disclosure may improve computing efficiency and bandwidth by reducing a number of manual operations and making an inexact process uniform and/or consistent. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
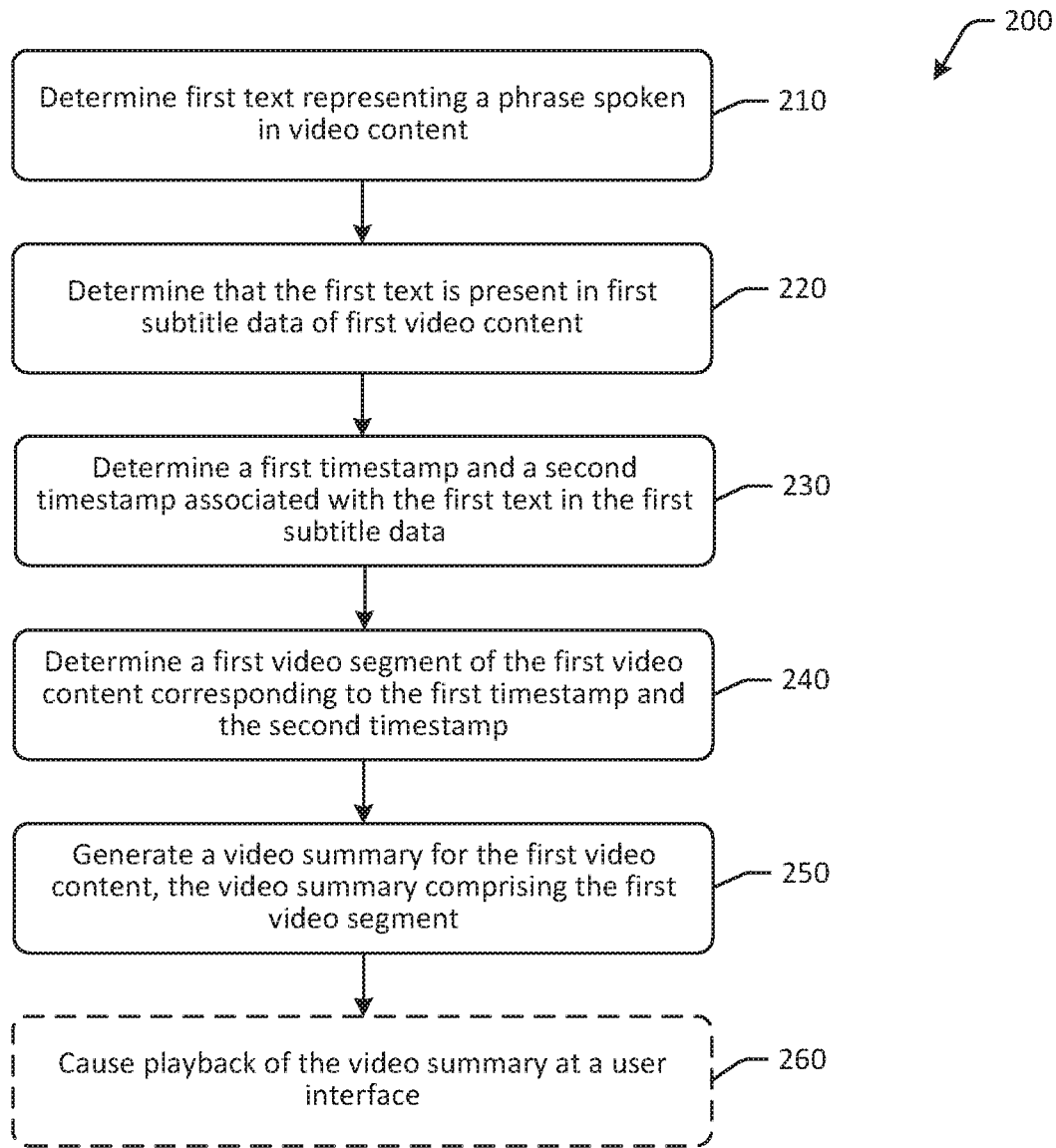
FIG. 2 is a schematic illustration of an example process flow for automated video summary generation using textual quotes in accordance with one or more example embodiments of the disclosure.

FIG. 2 depicts an example process flow 200 for automated video summary generation using textual quotes in accordance with one or more example embodiments of the disclosure. While example embodiments of the disclosure may be described in the context of movies or other video content, it should be appreciated that the disclosure is more broadly applicable to any type of digital content, such as series of audio or video content. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine first text representing a phrase spoken in video content. For example, one or more quote-to-video modules at a remote server may determine first text representing a phrase spoken in video content. The first text may be received by the remote server in text format (e.g., a user may input a text query, a third party service may provide popular quotes in text format, etc.), audio format (e.g., a user may speak a voice query that is translated to text, etc.), or another format. The first text may represent a phrase spoken in video content, or may otherwise be a quote that appears in video content. In some embodiments, to determine the first text representing a phrase spoken in video content, the remote server may receive the first text representing a phrase spoken in video content from a third party service, such as IMDb, a social media site, a hashtag aggregator, a meme generator, and/or another third party. In another example, the remote server may receive voice data indicative of a request to search for content, and may determine a speech-to-text transcription of the voice data. The speech-to-text transcription may be used as the first text.

At block 220 of the process flow 200, computer-executable instructions stored on a memory of a device, such as a remote server or a user device, may be executed to determine that the first text is present in first subtitle data of first video content. For example, one or more quote-to-video modules at a remote server may determine that the first text is present in first subtitle data of first video content. Subtitle or caption data may be provided with video content, or may be automatically generated using audio-to-text conversion. The remote server may determine a set of candidate video content that may potentially have a video segment in which the first text is spoken by a character. For example, the set of candidate video content may be a streaming content catalog that includes movies, shows, clips, and other video content. The remote server may determine subtitle data associated with the respective candidate video content and may use the subtitle data to determine whether there is a match between the first text and the text in any of the subtitle data. If there is an exact match, such that the exact text is found in subtitle data for particular video content, the remote server may, for example, determine that the first text is present in the subtitle data. For example, the remote server may determine that the first text is present in first subtitle data of first video content.

In some instances, however, an exact match may not be found. This may be due to an incorrect entry in the form or wording of the quote when received as the first text (e.g., the user does not remember the exact quote, etc.), an incorrect speech-to-text transcription, errors in the subtitle data, and so forth. In such instances, a closest match or set of closest matches may be determined. Closest matches may be determined based at least in part on scores generated for the matches. For example, relatively closer matches may have relatively higher scores. The remote server may identify the video content identifiers that include text that at least partially matches the first text and may determine scores for the respective video content identifiers based at least in part on a level of match. Matches may be determined based at least in part on a number of characters and/or words, and in some instances an arrangement of words, of the first text that appears in subtitle data.

For example, the remote server may determine second subtitle data of second video content, and may determine an amount of the first text present in the second subtitle data. The remote server may determine a first score for the second video content based at least in part on the amount of the first text present in the second subtitle data. The remoter server may determine an amount of the first text present in the first subtitle data, and may determine a second score for the first video content based at least in part on the amount of the first text present in the first subtitle data. The remote server may then rank the scores to determine which score is the highest and/or which video content is most likely to be accurate with respect to the first text.

In some embodiments, audio content associated with video content may be used in addition to, or instead of, text content (e.g., subtitle data, etc.) to determine words or phrases that occur in video content. For example, a remote server may analyze an audio file corresponding to a video. The audio file may include audible sounds, such as dialog, sound effects, soundtrack music, and the like corresponding to the video component of the video. For example, audio may be processed to extract dialog (e.g., filtered to remove sound effects, music, etc.), and the extracted dialog may be processed using speech-to-text processing algorithms. The output may be used to determine whether the first text is present.

At block 230 of the process flow 200, computer-executable instructions stored on a memory of a device, such as a remote server or a user device, may be executed to determine a first timestamp and a second timestamp associated with the first text in the first subtitle data. For example, one or more quote-to-video modules at a remote server may determine a first timestamp and a second timestamp associated with the first text in the first subtitle data. The remote server may determine that the first video content includes or is the closest match to the first text, and may therefore determine one or more timestamps associated with the portion of the subtitle data in which the quote or portion of the quote appears. The first timestamp may correspond to a time at which presentation of the first text is to be initiated, and the second timestamp may correspond to a time at which presentation of the first text is to cease, or is to be replaced with other subtitle content.

At block 240 of the process flow 200, computer-executable instructions stored on a memory of a device, such as a remote server or a user device, may be executed to determine a first video segment of the first video content corresponding to the first timestamp and the second timestamp. For example, a trailer generation engine at a remote server may determine a first video segment of the first video content corresponding to the first timestamp and the second timestamp. The first video segment may be determined based at least in part on frame-by-frame analysis of the video content. The first video segment may be a video segment of video content, and may be associated with text and/or audio components. The first video segment may be determined by identifying a frame that is to be presented at or near the first timestamp, another frame that is to be presented at or near the second timestamp, and a set of frames in between the frames. The first video segment may be extracted from a video file associated with the first video content. The first video segment may or may not include frames at the beginning and/or end of the timestamps (e.g., additional frames or fewer frames may be included for a smoother clip if needed, etc.).

In some embodiments, the remote server may extract and/or analyze individual frames of video content to determine whether the frames are part of the same segment or a different segment. Analysis of frames may include processing images using one or more object recognition algorithms, determining pixel color values, comparing certain portions of frames to previous or subsequent frames in the video, and the like. One or more object recognition algorithms may be used on individual frames or sets of frames in a video. The determined objects or features may be outputs of the respective modules or algorithms.

At block 250 of the process flow 200, computer-executable instructions stored on a memory of a device, such as a remote server or a user device, may be executed to generate a video summary for the first video content, the video summary comprising the first video segment. For example, the trailer generation engine at a remote server may generate a video summary for the first video content, the video summary comprising the first video segment. The remote server may generate the video summary, which may be a standalone video clip or may be included in a video summary, such as a trailer, of the first video content. The remote server may send the video summary in a data stream to the user device for presentation. The user may consume the video summary.

At optional block 260 of the process flow 200, computer-executable instructions stored on a memory of a device, such as a remote server or a user device, may be executed to cause playback of the video summary at a user interface. For example, the communication modules at a remote server may cause playback of the video summary at a user interface. The remote server may determine that a tile associated with the first video content is selected at a user interface (e.g., the user has selected the tile or movie icon, etc.) and causing presentation of the first video summary at the user interface.

Figure 3:
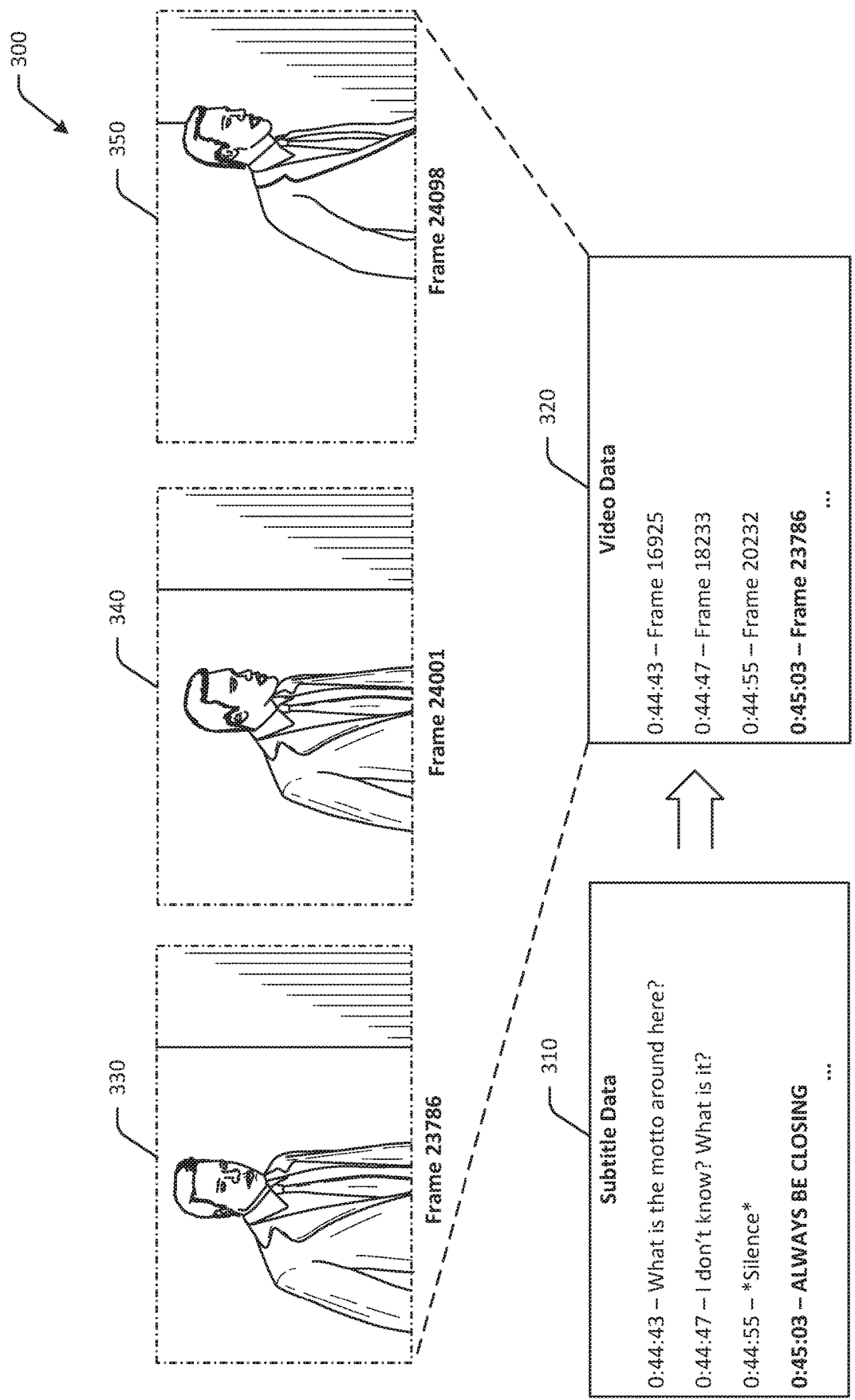
FIG. 3 is a schematic illustration of an example use case for extracting portions of video content in accordance with one or more example embodiments of the disclosure.

FIG. 3 is a schematic illustration of an example use case 300 for extracting portions of video content in accordance with one or more example embodiments of the disclosure. Different embodiments may include different, additional, or fewer inputs or outputs than those discussed with respect to the example of FIG. 3.

In the example of FIG. 3, a user may have requested video content where a character says "always be closing." In another example, the quote "always be closing" may have been determined to be popular by one or more remote servers. Based at least in part on subtitle data associated with video content, the one or more remote servers may determine or identify the video content in which the quote appears. For example, the remote server may determine that the quote appears in subtitle data 310, which may correspond to particular video content. The remote server may determine timestamp(s) associated with the quote using the subtitle data 310. For example, the remote server may determine that the quote is associated with a timestamp of 0:44:03, indicating that the text of the quote is to be presented at forty-four minutes and three seconds during playback of the video content. In some embodiments, an end time of the text may be represented as a timestamp as well.

The remote server may determine, using the timestamp data, corresponding video data. For example, the remote server may determine video data 320 or a video file associated with the video content. The video file may include a frame identifier of a frame that is to be presented at a certain time during playback of the video content. The remote server may determine that the frame that is to be presented at the forty-four minutes and three seconds mark is frame identifier 23,786. The remote server may determine a number of frames to include in the video segment. The number of frames may be for the duration of the quote. In some instances, the frames may be included until different subtitle text is to be presented. In other instances, the frames may be included based at least in part on an end timestamp associated with the subtitle text.

In the example of FIG. 3, the remote server may determine that a first frame 330 that corresponds to the frame identifier in the video data 320 may be included in the video segment, as well as a second frame 340, a third frame 350, and so forth, until an end of the quote (as determined based at least in part on the subtitle data 310). Accordingly, the video segment corresponding to the quote may be determined and extracted from the video file of the video content. The video segment may be stored as a standalone clip for presentation and/or may be included in video summary or trailer for the video content.

Figure 4A:
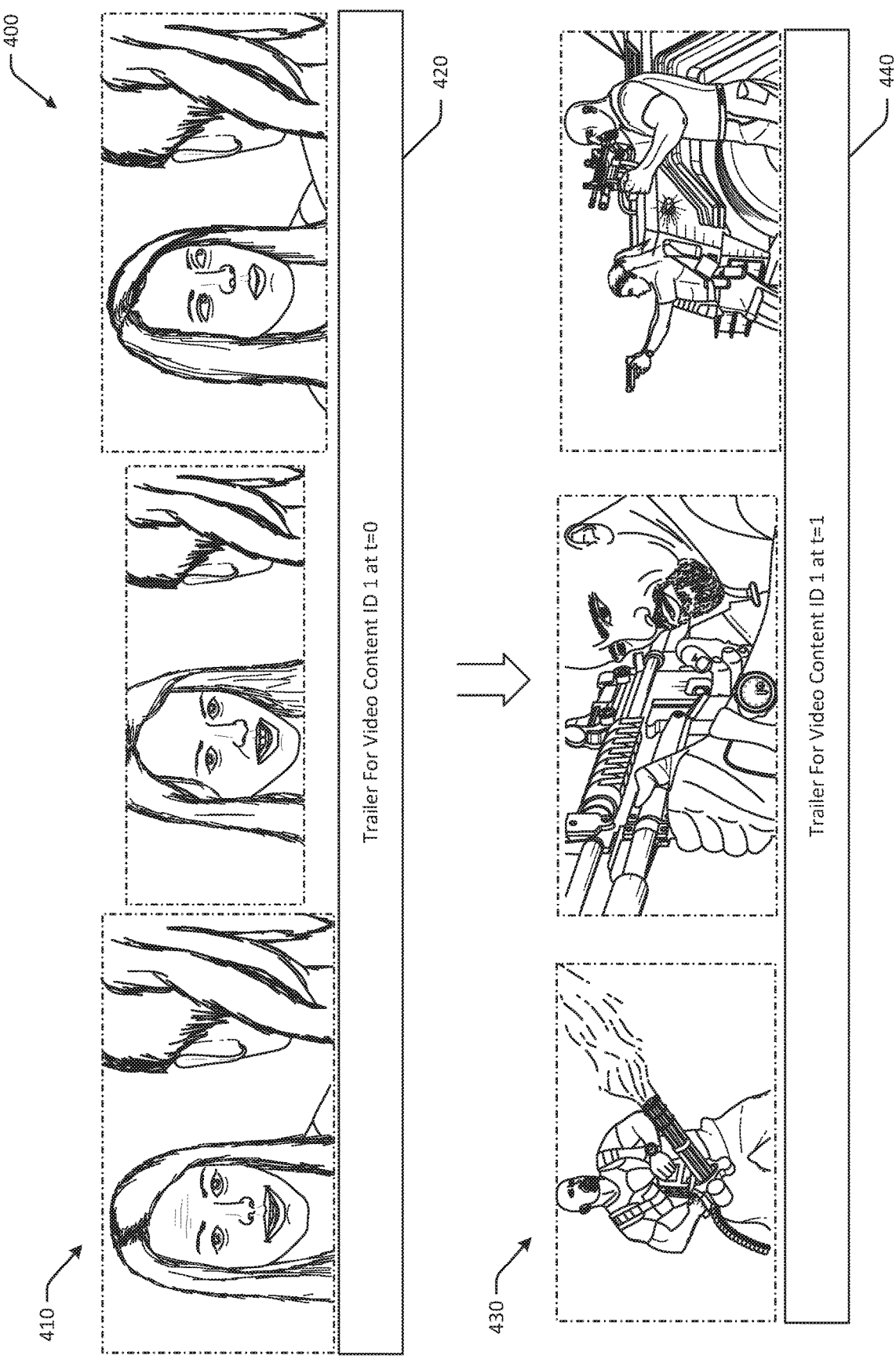
FIG. 4A is a schematic illustration of an example use case for automatically updating video summaries over time in accordance with one or more example embodiments of the disclosure.

FIG. 4A is a schematic illustration of an example use case 400 for automatically updating video summaries over time in accordance with one or more example embodiments of the disclosure. Different embodiments may include different, additional, or fewer inputs or outputs than those discussed with respect to the example of FIG. 4A.

In FIG. 4A, at a first instance 410, a first trailer 420 for video content, such as a movie, may be generated. The first instance 410 may be a first point in time, as denoted by "t=0." The first point in time may be, for example, before the video content is released. The first trailer 420 may include scenes and dialog related to a romance portion of the video content.

However, after release of the video content, users may actually like a different portion of the video content, and may like a quote that occurs during a segment of the video content that is not included in the first trailer 420.

Accordingly, at a second instance 430, one or more remote servers may generate a second trailer 440 for the same video content at a second point in time, as denoted by "t=1," that includes the popular quote. The popular quote may appear during a gunfight scene, and as a result, the second trailer 440 may include the gunfight scene instead of, or in addition to, the romance scene of the first trailer 420.

As a result, as popular quotes change over time, the trailer for the video content may be periodically updated. For example, at a subsequent point in time, the remote server may determine second text of a phrase spoken by a character in video content. The remote server may determine that the second text is present in the same subtitle data. The remote server may determine a third timestamp corresponding to a beginning of the second text, and may determine a fourth timestamp corresponding to an end of the second text. The remote server may extract a second video clip from the third timestamp to the fourth timestamp from the video file, and may generate an updated movie trailer for the video content, where the updated movie trailer includes the second video clip instead of the first video clip. Accordingly, as different quotes become popular over time, previously popular quotes may be replaced with currently popular quotes, or currently popular quotes may be added to previously popular quotes.

Figure 4B:
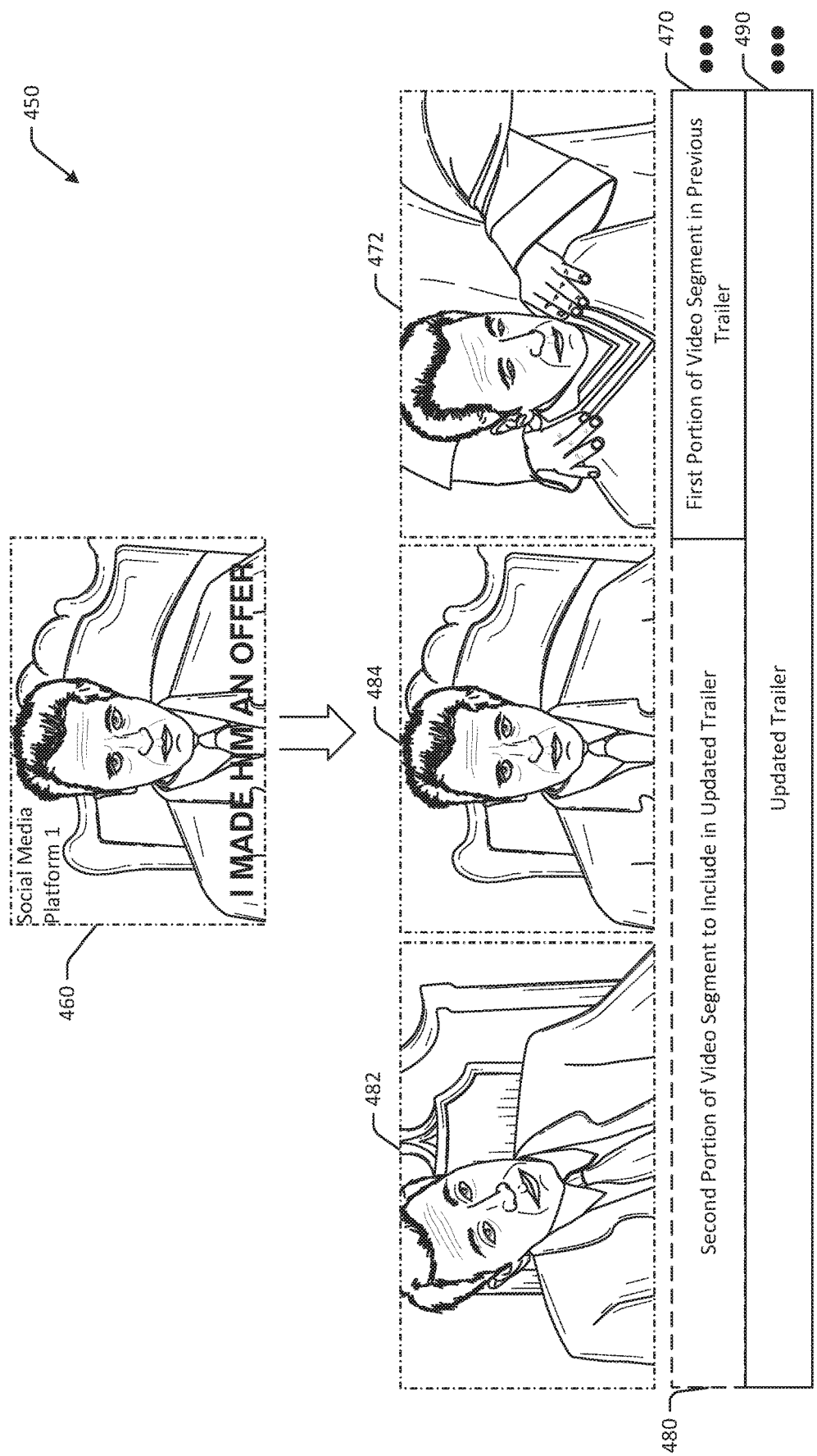
FIG. 4B is a schematic illustration of an example use case for automatically updating video summaries using trending data in accordance with one or more example embodiments of the disclosure.

FIG. 4B is a schematic illustration of an example use case 450 for automatically updating video summaries using trending data in accordance with one or more example embodiments of the disclosure. Different embodiments may include different, additional, or fewer inputs or outputs than those discussed with respect to the example of FIG. 4B.

In FIG. 4B, some embodiments may determine popular quotes based at least in part on sources such as meme or image sharing sites, social media platforms, and/or other sources. For example, a remote server may determine that a meme 460 is trending on social media. In other instances, a trailer of a video, a clip (e.g., a GIF, a video segment, etc.) of a video, or other portions of the content itself may be trending. The remote server may determine, in one example, that an image or video has been shared a threshold number of times on a social media platform. The remote server may determine text associated with the image or video, and, in some embodiments, may extract the text from the image or video. The extracted text may be used as an input to find a corresponding video clip or segment and to generate a trailer for the content.

For example, in FIG. 4B, the remote server may determine that the meme 460 has text of "I made him an offer" included in an image using character recognition or other computer vision processing. The remote server may extract the text. The remote server may determine video content associated with the extracted text. For example, the remote server may determine that certain video content includes a similar quote using subtitle data. In the example of FIG. 4B, the video content may be a movie with the quote "I'm going to make him an offer he can't refuse." The remote server may determine a corresponding video segment using timestamps associated with the subtitle data in which the quote appears.

The video segment may be extracted and included in a video summary for the video content. In some embodiments, additional portions of the video content may be included for context. For example, a few seconds in advance or after completion of a quote may be included to provide context to a user viewing the segment.

In some embodiments, previously generated trailers or video summaries may include a part of a quote, but not the quote in its entirety. In such instances, the portion of the segment in the trailer may be expanded to include the entire quote. For example, in FIG. 4B, a previous trailer 470 may include a first portion of a video segment (including, e.g., frame 472) that includes a partial of the desired quote. a second portion 480 of the video segment (including, e.g., frames 482 and 484) may not be included in the previous trailer. The remote server may therefore generate an updated trailer 490 that includes both the first portion 470 and the second portion 480 of the video segment (including, e.g., frames 472, 482 and 484), such that the entire quote is included in the updated trailer.

For example, the remote server may determine an existing movie trailer for a movie or other video content, and may determine that the existing movie trailer includes a portion of a first video clip that has a desired quote. The remote server may determine a third timestamp corresponding to a start of the portion of the first video clip, and may determine that a fourth timestamp corresponding to an end of the portion of the first video clip is the second timestamp (or that the end of the segment in the previous trailer matches the actual end of the segment and therefore no change is needed), and may replace the third timestamp with the first timestamp, such that the subsequently generated trailer expands to include the entire video segment. As a result, an entire new trailer may not have to be generated, but an existing trailer can be modified to include a complete segment.

Figure 5:
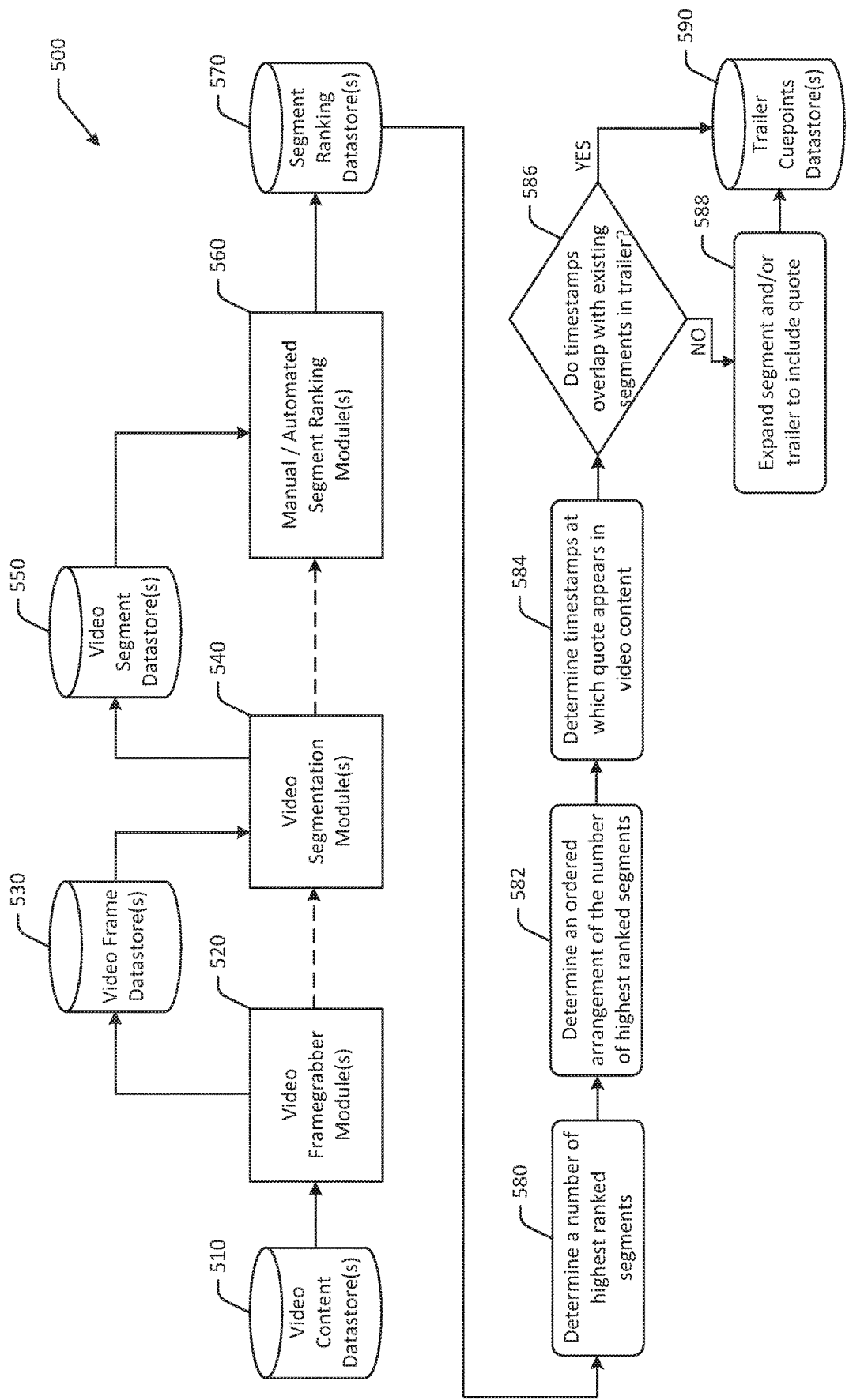
FIG. 5 is a schematic illustration of an example process and data flow in accordance with one or more example embodiments of the disclosure.

FIG. 5 is a schematic illustration of an example process and data flow 500 in accordance with one or more example embodiments of the disclosure. Different embodiments may include different, additional, or fewer inputs or outputs than those illustrated in the example of FIG. 5.

In the system illustrated in FIG. 5, a video content datastore 510 may include video files associated with video content. A video frame grabber module(s) 520 at a remote server may determine the video content from the video content datastore 510 and may extract one or more segments of the video content to determine segments of the video content and the corresponding frames. The video frame grabber module(s) 520 may select frames from the video content and may cause the frames to be stored at a video frame datastore 530. In some embodiments, timestamp data corresponding to the frames may be stored at the video frame datastore 530.

A video segmentation module(s) 540 may read the frames in the video frame datastore 530 and/or may receive the frames from the video frame grabber module(s) 520 and may determine the segments that the frames correspond to. The video segmentation module(s) 540 may write the segment data to a video segment datastore 550.

A manual or automated segment ranking module(s) 560 may read the segments in the video segment datastore 550 or may receive the segments from the video segmentation module(s) 540. The manual or automated segment ranking module(s) 560 may generate importance scores for respective video segments and may determine rankings for the segments using the scores.

The segment importance ranking values may be stored at a segment ranking datastore 570 and may be used to generate video summaries. In some embodiments, the segment ranking datastore 570 may be stored in cache memory to allow for reduced latency in on demand video summary generation.

One or more remote servers may implement one or more operations to automatically generate video summaries using textual quotes. An example process is illustrated in FIG. 5. For example, at block 580, the remote server may determine a number of highest ranked segments for a particular video content using the segment ranking datastore 570. The number of highest ranked segments that is determined may be based at least in part on a total length of a summary that is desired. For example, if a relatively longer summary is desired, a greater number of segments may be determined. If a shorter summary is desired, a lesser number of segments may be determined. Segment ranks may be determined based at least in part on the importance scores associated with the respective segments. In some embodiments, a segment in which a popular quote appears may not be a highest ranked segment based on importance. In such embodiments, the segment with the quote may be added to the summary. In other embodiments, the segment in which a popular quote appears may be included in the number of highest ranked segments regardless of a score associated with the segment in some embodiments. In some embodiments, the segment in which a popular quote appears may have a maximum importance score to ensure inclusion in the video summary.

At block 582, the remote server may determine an ordered arrangement of the number of highest ranked segments. For example, the remote server may determine a chronological order for the selected segments based at least in part on when they occur in the video content. For example, the selected segments may be arranged based at least in part on the order in which they occur in the video content.

At block 584, the remote server may determine timestamps at which a quote appears in the video content. For example, the remote server may determine, using subtitle data, timestamps at which a popular quote appears in the video content.

At determination block 586, the remote server may determine whether the timestamps overlap with existing segments in a trailer. For example, the remote server may determine whether the timestamps are included in any of the selected segments. If so, this may indicate that the popular quote is already included in the video summary. The process may then end with storing of trailer cue points in a trailer cue point datastore(s) 590, which can be used to generate video summaries or trailers. The trailer cue points may include the timestamps corresponding to video segments that are to be included in a trailer for the video content. If the remote server determines that the timestamps do not overlap with the selected segments, the remote server may, at block 588, expand the trailer and/or segment to include the quote. For example, the trailer may be expanded to include the segment in which the quote appears, or if the quote partially appears, the portion of the segment that is included in the trailer may be expanded to include the entire segment corresponding to the quote. As a result, the quote may be included in the trailer.

In some embodiments, the segment with the quote may be presented in its chronological order, while in other embodiments, the segment with the quote may be presented at a different time, such as at the beginning of a trailer. For example, the remote server may determine that a first video segment is present in a video summary for first video content, and may reorder an arrangement of video segments of the video summary to present the first video segment in a first position of the arrangement. As a result, the segment with the quote may be presented first, and users may therefore identify the video content with the quote, if the user is familiar with the quote. The process may then end with storing of trailer cue points in a trailer cue point datastore(s) 590.

Figure 6:
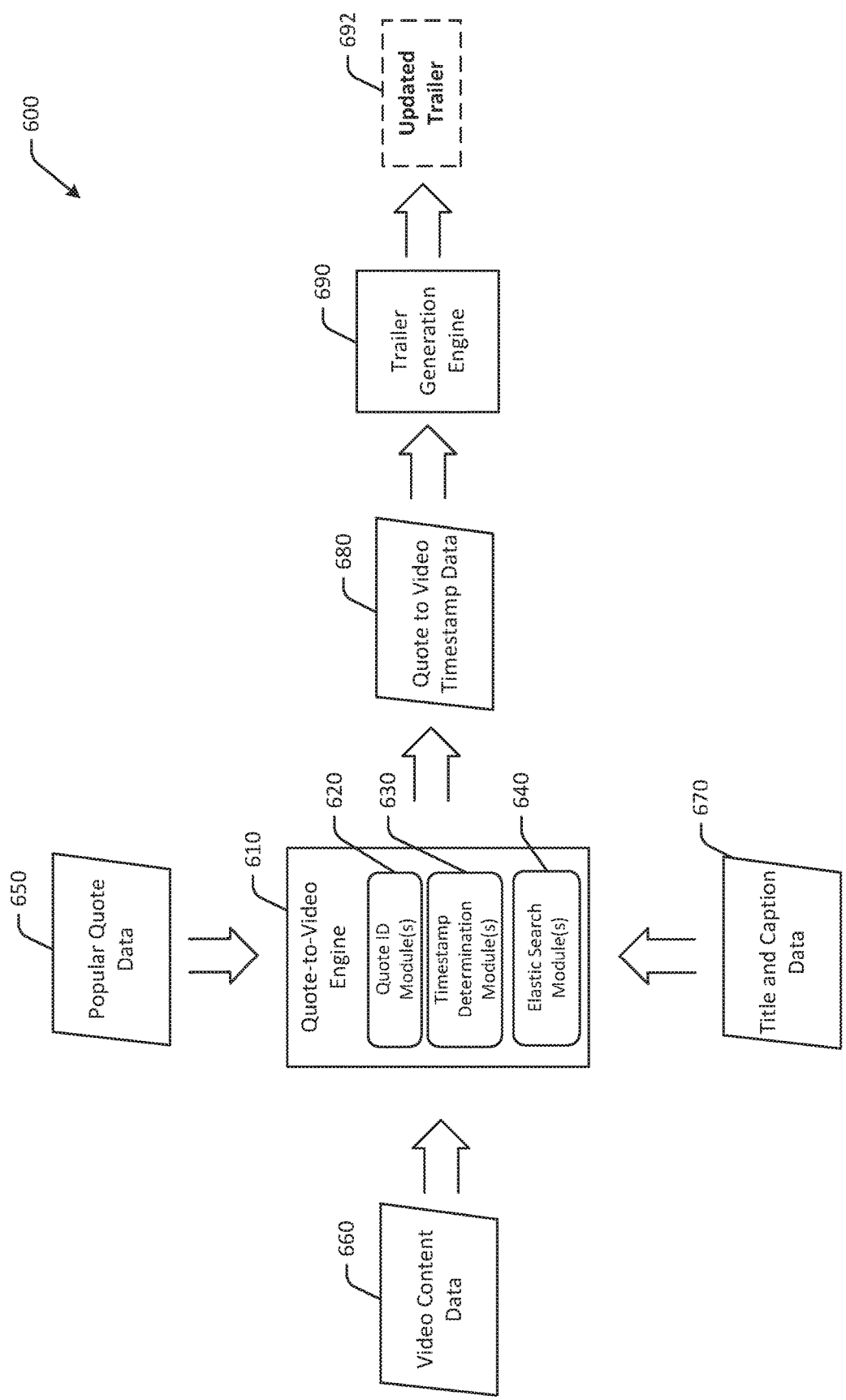
FIG. 6 is a schematic illustration of an example data flow for generating content summaries in accordance with one or more example embodiments of the disclosure.

FIG. 6 is a schematic illustration of an example data flow 600 for generating content summaries in accordance with one or more example embodiments of the disclosure. Different embodiments may include different, additional, or fewer inputs or outputs than those illustrated in the example of FIG. 6.

In FIG. 6, an example data flow 600 is schematically depicted. A quote-to-video engine 610 and/or one or more trailer generation module(s) may be configured to generate video summaries using textual quotes. The quote-to-video engine 610 may be stored at and/or executed by one or more remote servers. The quote-to-video engine 610 may include one or more modules or algorithms, and may be configured to generate video summaries for consumed portions of video content.

For example, the quote-to-video engine 610 may include one or more quote identification modules 620, one or more timestamp determination modules 630, and/or one or more elastic search modules 640. Additional or fewer, or different, modules may be included. The quote identification module(s) 620 may be configured to process and/or analyze video content. For example, the quote identification module(s) 620 may be configured to determine text data associated with video content, such as subtitle data. The quote identification module(s) 620 may be configured to determine or receive quotes, such as quotes input as queries by users, in textual and/or voice format. In some embodiments, the quote identification module(s) 620 may be configured to determine quotes from third party services, such as IMDB, meme sharing services, social media services, and/or other sources. The quote identification module(s) 620 may be configured to determine whether a quote is a popular quote. For example, the quote identification module(s) 620 may be configured to determine whether a quote or related hashtag is trending, a number of shares or likes the quote or related content has on social media sites, and so forth. The quote identification module(s) 620 may be configured to determine one or more thresholds to determine popularity and/or relative popularity.

The timestamp determination module(s) 630 may be configured to determine timestamps that correspond to identified text in subtitles or other text data. The timestamp determination module(s) 630 may be configured to determine video segments that correspond to timestamps. For example, the timestamp determination module(s) 630 may be configured to analyze or determine frames or sets of frames of video content using timestamp data. The timestamp determination module(s) 630 may be configured to detect or analyze frames in video content to determine which frames correspond to the same scene or segment.

The elastic search module(s) 640 may be configured to determine search results using textual quotes and subtitles or other text data associated with video content. The elastic search module(s) 640 may determine whether or not an exact match appears in the subtitle data for one or more pieces of video content (and/or corresponding text). In some instances, such as if there is no exact match or there is a partial match, the elastic search module(s) 640 may determine one or more scores that correspond to respective video content, where the scores are indicative of a level of match between the quote query and the text data for respective video content. The elastic search module(s) 640 may be configured to determine a ranking of content based at least in part on the respective scores. The elastic search module(s) 640 may be configured to analyze and/or process video content so as to identify one or more quotes or phrases that appear in a certain video segment.

The quote-to-video engine 610 may receive one or more inputs that may be used to generate video summaries. For example, the quote-to-video engine 610 may receive one or more of video content data 660 associated with candidate video content that may include certain quotes, popular quote data 650 that may include data related to popular or trending quotes (that may or may not be associated with particular video content), and/or title and caption data 670 that may include text data associated with respective video content (e.g., title text, caption and/or subtitle text, etc.). In some embodiments, the video content data 660 may be associated with audio data and/or text data 670 that may be extracted from a content file.

The quote-to-video engine 610 may process the respective data to generate a video summary. For example, the quote-to-video engine 610 may determine popular quotes using the popular quote data 650. In some instances, the popular quote data 650 may include quotes for which users have input queries. The quote-to-video engine 610 may determine, using the title and caption data 670, one or more pieces of video content that may include the popular quote. The quote-to-video engine 610 may determine whether an exact match exists and/or a most likely match using scores. The quote-to-video engine 610 may determine timestamps associated with the subtitle data that includes the quote text. The quote-to-video engine 610 may determine, using the video content data 660, corresponding video segment using the timestamps at which the quote appears in the video content.

The video content data 650 may be processed using one or more of the quote identification module(s) 620, the timestamp determination module(s) 630, and/or the elastic search module(s) 640. The popular quote data 650 may be processed using one or more of the quote identification module(s) 620. The title and caption data 670 may be processed using one or more of the quote identification module(s) 620, the timestamp determination module(s) 630, and/or the elastic search module(s) 640.

The quote-to-video engine 610 may output quote to video timestamp data 680. The quote to video timestamp data 680 may include timestamps and/or other identifiers of a video segment or video clip that includes the popular quote.

The quote to video timestamp data 680 may be input at a trailer generation engine 690. The trailer generation engine 690 may be used to generate a video summary for the video content that includes the identified video segment with the popular quote. The trailer generation engine 690 may output an optional updated trailer 692 that may include the popular quote. \

As popular quotes change over time, the trailer for the video content may be periodically updated. For example, at a subsequent point in time, the quote-to-video engine 610 may determine second text of a phrase spoken by a character in video content. The quote-to-video engine 610 may determine that the second text is present in the same subtitle data. The quote-to-video engine 610 may determine a third timestamp corresponding to a beginning of the second text, and may determine a fourth timestamp corresponding to an end of the second text. The trailer generation engine 690 may extract a second video clip from the third timestamp to the fourth timestamp from the video file, and may generate an updated movie trailer for the video content, where the updated movie trailer includes the second video clip instead of the first video clip. Accordingly, as different quotes become popular over time, previously popular quotes may be replaced with currently popular quotes, or currently popular quotes may be added to previously popular quotes.

In some embodiments, the trailer generation engine 690 may be configured to generate video summaries around a certain theme. For example, a theme of the video segment may be determined based at least in part on the quote, and the trailer generation engine 690 may determine a second video segment associated with the theme, where the trailer includes the first video segment and the second video segment.

The quote-to-video engine 610 and/or optionally the trailer generation engine 690 may output a video content summary 692 that may be sent to a user device for presentation. As a result, users may consume video summaries or video clips with popular quotes.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
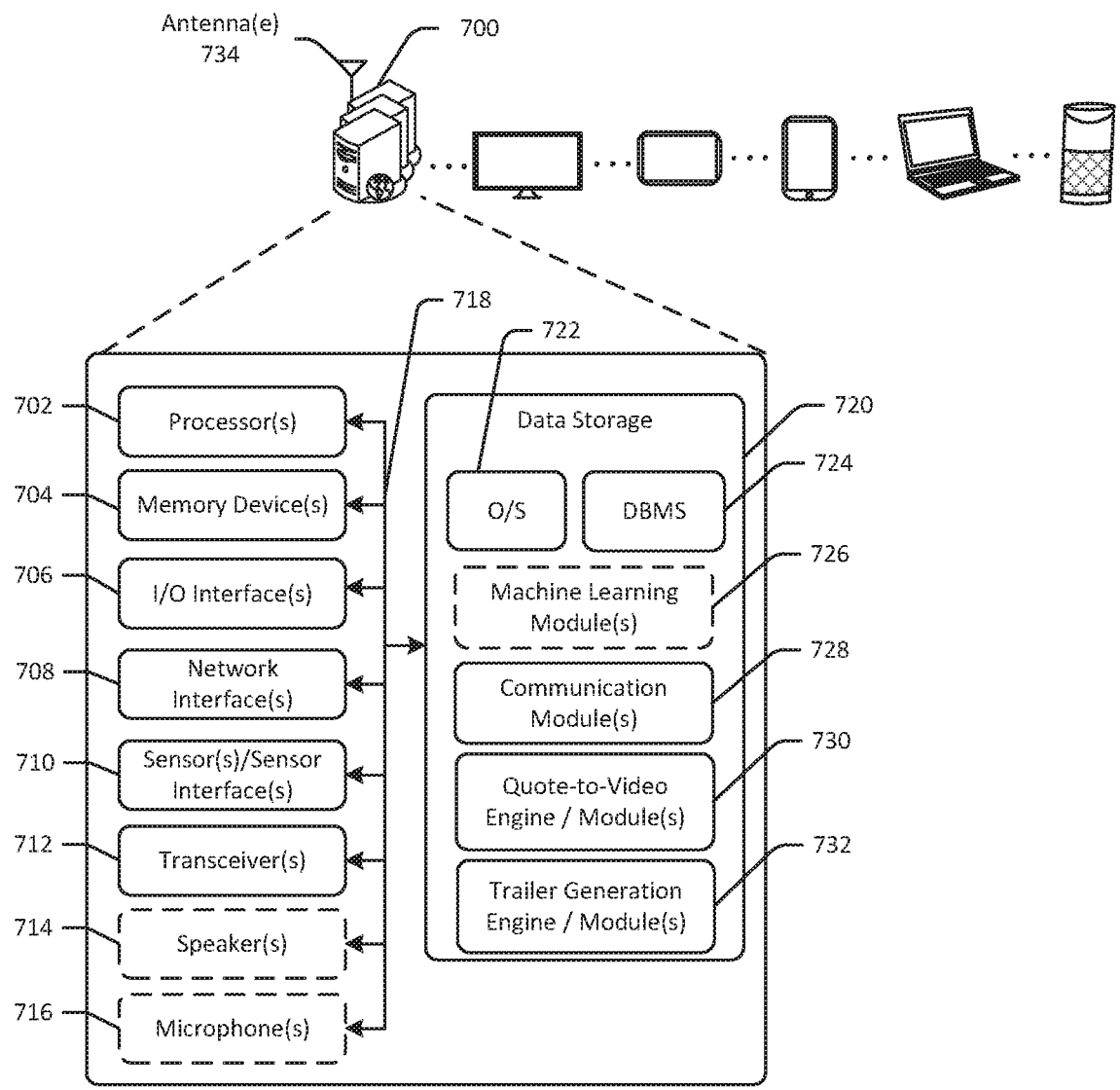
FIG. 7 is a schematic block diagram of an illustrative device in accordance with one or more example embodiments of the disclosure.

FIG. 7 is a schematic block diagram of an illustrative remote server 700 in accordance with one or more example embodiments of the disclosure. The remote server 700 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The remote server 700 may correspond to an illustrative device configuration for the devices of FIGS. 1-6.

The remote server 700 may be configured to communicate via one or more networks with one or more servers, search engines, user devices, or the like. In some embodiments, a single remote server or single group of remote servers may be configured to perform more than one type of video summarization generation functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 700 may include one or more processors (processor(s)) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The remote server 700 may further include one or more buses 718 that functionally couple various components of the remote server 700. The remote server 700 may further include one or more antenna (e) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the remote server 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the remote server 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more optional machine learning module(s) 726, one or more communication module(s) 728, one or more quote-to-video engine/module(s) 730, and/or one or more trailer generation engine/module(s) 732. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the remote server 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, user preference information, user action information, user profile information, historical content consumption information, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the remote server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the optional machine learning module(s) 726 may include computer-executable instructions, code, or the like that responsive to execution by one or more of the processor(s) 702 may perform functions including, but not limited to, determining summary length, determining importance thresholds, determining a number of segments to include in a video summary, determining frames of content, and the like.

The communication module(s) 728 may include computer-executable instructions, code, or the like that responsive to execution by one or more of the processor(s) 702 may perform functions including, but not limited to, communicating with one or more devices, for example, via wired or wireless communication, communicating with remote servers, communicating with remote datastores, sending or receiving notifications or commands/directives, communicating with cache memory data, communicating with user devices, and the like.

The quote-to-video engine/module(s) 730 may include computer-executable instructions, code, or the like that responsive to execution by one or more of the processor(s) 702 may perform functions including, but not limited to, analyzing digital content, extracting frames, determining subtitle or caption data, searching text data and/or subtitle data, determining text inputs, determining speech inputs, determining or analyzing text and/or audio files, identifying certain portions of content, extracting segments of content, and the like.

The trailer generation engine/module(s) 732 may include computer-executable instructions, code, or the like that responsive to execution by one or more of the processor(s) 702 may perform functions including, but not limited to, selecting segments or portions of segments to include in a summary video, selecting music or portions of music or other sounds to include in a summary video file, selecting a specific summary for a user based on user preferences, generating video summaries, determining elapsed times, determining consumed portions, and the like.

Referring now to other illustrative components depicted as being stored in the data storage 720, the O/S 722 may be loaded from the data storage 720 into the memory 704 and may provide an interface between other application software executing on the remote server 700 and hardware resources of the remote server 700. More specifically, the O/S 722 may include a set of computer-executable instructions for managing hardware resources of the remote server 700 and for providing common services to other application programs (e.g., managing memory allocation among various application programs). In certain example embodiments, the O/S 722 may control execution of the other program module(s) to for content rendering. The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 700 is a mobile device, the DBMS 724 may be any suitable light-weight DBMS optimized for performance on a mobile device.

Referring now to other illustrative components of the remote server 700, the input/output (I/O) interface(s) 706 may facilitate the receipt of input information by the remote server 700 from one or more I/O devices as well as the output of information from the remote server 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna (e) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 700 may further include one or more network interface(s) 708 via which the remote server 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna (e) 734 may include any suitable type of antenna depending, for example, on the communications protocols used to transmit or receive signals via the antenna (e) 734. Non-limiting examples of suitable antennas may include directional antennas, non-directional antennas, dipole antennas, folded dipole antennas, patch antennas, multiple-input multiple-output (MIMO) antennas, or the like. The antenna (e) 734 may be communicatively coupled to one or more transceivers 712 or radio components to which or from which signals may be transmitted or received.

As previously described, the antenna (e) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna (e) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11 g, 802.11n), 5 GHz channels (e.g., 802.11n, 802.11ac), or 60 GHz channels (e.g., 802.11ad). In alternative example embodiments, the antenna (e) 734 may be configured to transmit or receive radio frequency signals within any suitable frequency range forming part of the unlicensed portion of the radio spectrum.

The antenna (e) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna (e) 734-transmitting or receiving radio frequency (RF) signals in the bandwidth and/or channels corresponding to the communications protocols utilized by the remote server 700 to communicate with other devices. The transceiver(s) 712 may include hardware, software, and/or firmware for modulating, transmitting, or receiving—potentially in cooperation with any of antenna (e) 734—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the remote server 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the remote server 700 may include alternate and/or additional hardware, software, or firmware components beyond those described or depicted without departing from the scope of the disclosure. More particularly, it should be appreciated that software, firmware, or hardware components depicted as forming part of the remote server 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The invention claimed is:

1. A system comprising:
   memory configured to store computer-executable instructions; and
   at least one computer processor configured to access the memory and execute the computer-executable instructions to:
      determine first text representing a phrase spoken in unidentified video content;
      determine that the first text is present in first subtitle data of first video content;
      determine an amount of the first text present in the first subtitle data;
      determine a first score for the first video content based at least in part on the amount of the first text present in the first subtitle data;
      determine second subtitle data of second video content;
      determine an amount of the first text present in the second subtitle data;
      determine a second score for the second video content based at least in part on the amount of the first text present in the second subtitle data;
      determine that the first score is greater than the second score;
      determine a first timestamp and a second timestamp associated with the first text in the first subtitle data;
      determine a first video segment of the first video content corresponding to the first timestamp and the second timestamp;
      generate a video summary for the first video content, the video summary comprising the first video segment;
      determine that the first video segment is present in a second video summary for the first video content; and
      reorder an arrangement of video segments of the second video summary to present the first video segment in a first position of the arrangement.

2. The system of claim 1, wherein the first video summary is generated at a first time, and wherein the at least one processor is further configured to access the memory and execute the computer-executable instructions to:
   determine, at a second time, second text of a phrase spoken in unidentified video content;
   determine that the second text is present in the first subtitle data;
   determine a third timestamp corresponding to a beginning of the second text;
   determine a fourth timestamp corresponding to an end of the second text;
   determine a second video segment of the first video content corresponding to the third timestamp and the fourth timestamp; and
   generate a second video summary, wherein the second video summary comprises the second video segment instead of the first video segment.

3. The system of claim 1, wherein the at least one processor is further configured to access the memory and execute the computer-executable instructions to:
   determine a theme associated with the first video segment; and
   determine a second video segment associated with the theme, wherein the first video summary further comprises the second video segment.

4. The system of claim 1, wherein the at least one processor is further configured to access the memory and execute the computer-executable instructions to:
   determine that a tile associated with the first video content is selected at a user interface; and
   cause presentation of the first video summary at the user interface.

5. The system of claim 1, wherein to determine the first text representing a phrase spoken in video content comprises to receive the first text representing a phrase spoken in unidentified video content from a third party service.

6. The system of claim 1, wherein the at least one processor is further configured to access the memory and execute the computer-executable instructions to:
   determine an image or video that has been shared a threshold number of times on a social media platform, wherein the image or video comprises the first text; and
   extract the first text from the image or video.

7. The system of claim 1, wherein the at least one processor is further configured to access the memory and execute the computer-executable instructions to:
   determine a second video summary for the first video content;
   determine that the second video summary comprises a portion of the first video segment;
   determine a third timestamp corresponding to a start of the portion of the first video segment;
   determine that a fourth timestamp corresponding to an end of the portion of the first video segment is the second timestamp; and
   replace the third timestamp with the first timestamp.

8. The system of claim 1, wherein the at least one processor is further configured to access the memory and execute the computer-executable instructions to:
   receive voice data indicative of a request to search for content; and
   determine a speech-to-text transcription of the voice data, wherein the speech-to-text transcription is the first text.

9. The system of claim 1, wherein the first timestamp corresponds to a time at which presentation of the first text is to be initiated, and wherein the second timestamp corresponds to a time at which presentation of the first text is to cease.

10. The system of claim 1, wherein to determine that the first video segment is present in a second video summary for the first video content comprises to determine only a portion of the first video segment is present in the second video summary.

11. The system of claim 10, wherein the at least one processor is further configured to access the memory and execute the computer-executable instructions to:
   expand the portion of the first video segment to include substantially all of the first video segment within the second video summary.

12. The system of claim 1, wherein the at least one processor is further configured to access the memory and execute the computer-executable instructions to:
   receive popular quote data associated video content, wherein the popular quote data includes the first text.

13. The system of claim 1, wherein the at least one processor is further configured to access the memory and execute the computer-executable instructions to:
   determine that the first video segment is not present in a third video summary for the first video content;
   removing a second video segment from the third video summary; and adding the second video segment to the third video summary.

14. The system of claim 13, wherein the at least one processor is further configured to access the memory and execute the computer-executable instructions to:

reorder an arrangement of video segments of the third video summary to present the second video segment in a first position of the arrangement.

\* \* \* \* \*